Figure 1:
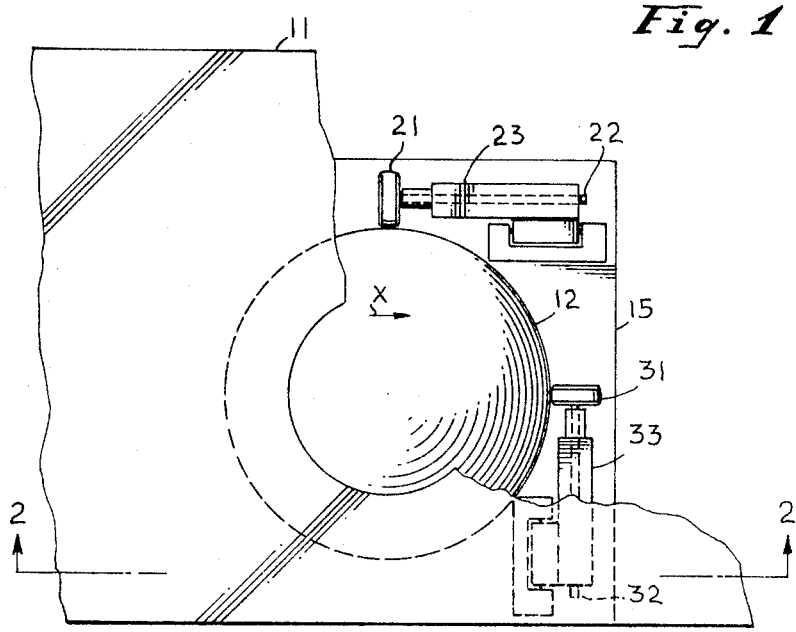

Aug. 30, 1966          G. M. LAMAN          3,269,190

POSITION CONTROL BALL ASSEMBLY

Filed Aug. 9, 1965

INVENTOR
GEORGE M. LAMAN
BY Arthur Freilich

ATTORNEY

United States Patent Office 3,269,190
Patented August 30, 1966

3,269,190
POSITION CONTROL BALL ASSEMBLY
George M. Laman, Los Angeles, Calif., assignor to The Bunker-Ramo Corporation, Stamford, Conn., a corporation of Delaware
Filed Aug. 9, 1965, Ser. No. 478,390
6 Claims. (Cl. 74—471)

This invention relates to a positioning assembly and, more particularly, to an improved positioning assembly incorporating a manually rotatable control ball.

At present various systems are available for generating signals to be used in controlling the position or performance of a device. Electrical, mechanical, electromechanical and electro-optical principles are but a few examples of the principles underlying such positioning control techniques. Some important requirements which, substantially, any position control system has to fulfill, are that it be reliable, easy to operate, and require a minimum amount of maintenance and repair. U.S. patent application Serial No. 331,894, filed December 19, 1963, entitled, "Position Control Ball Assembly," by Irving H. Alexander and assigned to the same assignee as the present application discloses a system which meets those requirements and which in addition possesses other advantages which are set forth in detail therein.

An embodiment of the cited patent application is intended to be used for generating signals which are functions of the degrees of rotation and the directions thereof of positioning shafts which are coupled to a manually rotatable component such as a control ball. When the control ball is rotated, the coupled positioning shafts are caused to rotate, their degrees of rotations being proportional to the degree of motion of the control ball, while their directions of rotation are a function of the direction of motion of the control ball. The positioning shafts are so coupled to the control ball and positioned with respect to one another that their respective degrees of rotation are proportional to the components of motion of the control ball along two corresponding axes perpendicular or orthogonal with respect to one another, such as the X and Y axes in a Cartesian coordinate system. The control ball in the cited patent application is urged against a pair of fixed rollers by a pair of spring loaded rollers which function to at least in part restrict translational movement of the ball when rotated by hand. The ball is supported on a bearing pad formed of a substantially non-stick, low friction material which permits the ball to easily rotate thereon. The upper portion of the ball is allowed to project through a circular opening in the surface of a control panel to permit the ball to be rotated by hand. In order to minimize the collection of dust particles on the bearing pad the ball is placed in the closest proximity to the hole edges as is feasible. However, in the arrangement shown in the above cited patent application certain nonuniform frictional characteristics are inherent. First of all, if the ball is placed close enough to the edges of the opening in the control panel to be effective in reducing the collection of dirt on the bearing pad, it then happens that minute translational movement of the ball as permitted by the spring loaded rollers allows the ball to touch the edges of the control panel opening. When this occurs the friction acting to restrain ball rotation increases. Moreover, to the extent that dust or dirt particles riding on the surface of the ball get by the edges of the control panel opening, they tend to collect on the area of the bearing pad upon which the ball is supported. After a considerable period of use the ball then no longer rides on the smooth non-stick pad but upon the collected particles, thus increasing rotational friction. Lastly, an additional nonuniform frictional effect is produced as a function of the direction in which the ball is rotated since the spring loaded rollers acting to restrain translation movement of the ball rotate in but one plane only. Hence, in rotating the ball in certain directions it is caused to drag across the surfaces of the spring loaded rollers.

In accordance with the present invention, an improved control ball mounting means is provided which is effective to give the ball a smoother, more uniform, response to an operator's touch than was available from heretofore known mounting means.

Briefly, in accordance with the present invention, a control ball is supported on, and partially projects through, a ring formed of a non-stick, low friction material, such as a fluorocarbon resin compound, or more particularly, a material manufactured by the E. I. du Pont Company bearing the trade name "Teflon." The ball can be made of hard rubber. Due to the characteristics of the fluorocarbon resin compound, the ring exhibits very low friction and non-stick qualities, so that the ball is easily rotatable about its center. As a consequence of the ball projecting through the fixedly mounted ring, translational movement of the ball is prevented without the use of spring loaded rollers urging the ball against fixed rollers. Further, since the fluorocarbon resin compound is softer than the material of which the ball is made, any wear due to weight or friction, however small, will be absorbed by the ring, which is easily and inexpensively replaceable. A significant advantage of the supporting ring employed in accordance with the present invention is that the ring functions to clean the ball as it is rotated.

Figure 2:
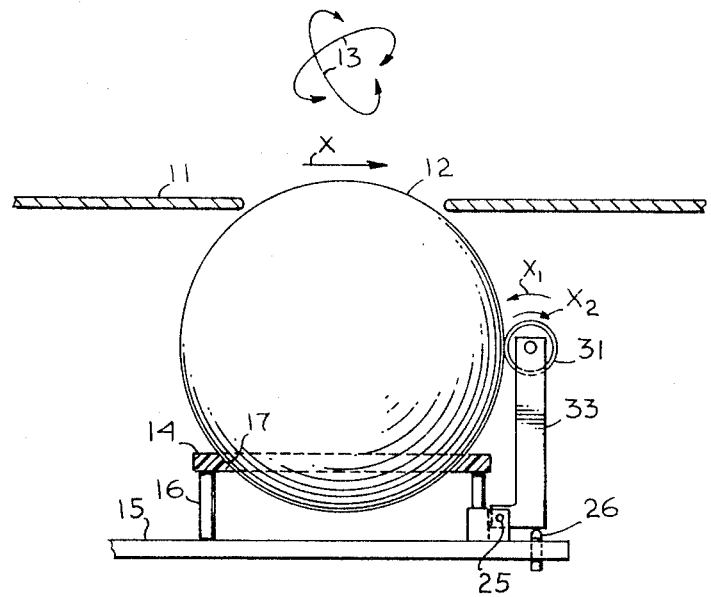

The novel features which are believed to be characteristic of the invention, together with other features and advantages thereof, will be better understood from the following description taken in conjunction with the accompanying drawing, in which:

FIGURE 1 is a plan view of a position control assembly including mounting means in accordance with the present invention; and FIG. 2 is a sectional view taken substantially along the plane 2—2 of FIG. 1.

Reference is now made to the drawings wherein a portion of a top of a display table or console 11 is shown with the top part of a position control ball 12 extending through an opening therein. As indicated by arrows 13, the ball 12 may be rotated about its center in any direction by manually moving the portion thereof which protrudes through the console top 11. The ball 12 is supported on a ring 14 which is held above a base plate 15 by brackets 16. The inner surface 17 of the ring 14 is preferably cut at an angle so that it is substantially tangential to the surface of the ball 12.

The control ball 12 is frictionally coupled to rotatable transducing means comprising two rollers 21 and 31, which are respectively mounted on rotatable shafts 22 and 32. The rotatable shafts are in turn conventionally mounted in housings 23 and 33 with the shafts being rotatable therein about their longitudinal axes. Each of the housings 23 and 33 is pivotally mounted on the base plate 15 by a pivot arrangement 25, shown in FIG. 2. Further, each of the housings has a spring plunger 26 which is mounted on and extends through the base plate for contacting and biasing the housings 23 and 33 towards the ball 12, so that the rollers 21 and 31 are frictionally coupled to the position control ball 12 even though the diameter of the rollers may decrease due to wear.

As can be seen from the drawings, the axes of rotation of rollers 21 and 31 are perpendicular to one another. The axes of both rollers and the center of the position controll ball 12 lie in substantially a single plane which is parallel to the base plate 15. The ball 12 is free to rotate in ring 14 about its center only, inasmuch as any translational movement is prevented by the ring.

Let us assume that the position control ball 12 is manually rotated in a direction indicated by arrows X in FIGS. 1 and 2. It is apparent that the motion of the ball will cause the roller 31, which is frictionally coupled thereto, to respond to such motion by rotating in a counterclockwise direction as indicated by an arrow $X_1$ in FIG. 2. It is also apparent that if the control ball 12 is rotated in a direction opposite to that indicated by the arrow X, the roller 31 will rotate in a clockwise direction as indicated by an arrow $X_2$ (FIG. 2). Similarly, the degree and direction of rotation of the roller 21 about a Y axis perpendicular to the X axis is a function of the degree and direction of motion of the ball 12 about a Y axis. If the control ball 12 is rotated in directions other than the X and Y directions, the rollers 21 and 31 will rotate, their degrees of rotation and the directions thereof being functions of the components of motion of the ball 12 in directions perpendicular to the axes of rotation of the rollers. Since the rollers 21 and 31 are mounted on rotating shafts 22 and 32, it is apparent that the rotation of the rollers will be translated to cause the shafts to rotate as a function of the motion or rotation of the control ball 12. In turn, various mechanical, electrical, or electromechanical techniques (not shown) may be employed to translate or convert into signals the degree of rotation and direction thereof of each of the shafts 22 and 32, such signals being useful in controlling the positions of any subsystem which may be designed to be responsive to the signals.

From the foregoing description it is apparent that the present invention provides a position control assembly useful for generating signals for position controlling purposes by manually rotating a position control ball which is partially exposed through the top of a surface 11. In one embodiment of the invention, the control ball is about four inches in diameter, is made of hard rubber which is convenient for manual rotation, and is frictionally coupled to the rollers 21 and 31 described herebefore, so that the rollers 21 and 31 detect its components of rotation or motion quite accurately. It is of course desirable that the ball be mounted so that it can be both easily rotated and will not wear or be deformed due to frictional forces acting on it. Therefore, according to the teachings disclosed herein, the ball 12 is supported in ring 14 above the base plate 15. The ring 14 is preferably a fluorocarbon resin compound, such as the material known commercially as "Teflon." Such material has excellent non-stick low-friction characteristics so that the control ball 12 can be rotated about its center with minimal frictional forces generated between the ball 12 and the ring 14. An added advantage of using a ring made of a fluorocarbon resin compound is that the ring is softer than the control ball so that any wear due to friction or weight of the ball will be absorbed by the ring, which when becoming excessively worn can be readily replaced. Since the ring prevents any translational movement of the ball, the ball will never be subjected to any frictional effects other than those provided by the ring. Moreover since the friction provided by the ring will be constant regardless of the direction in which the ball is rotated, the ball will respond smoothly and consistently to an operator's touch. Further, the ball is maintained clean as a consequence of the brushing action provided by the ring against the ball.

It is apparent that the invention provides a position control ball assembly which has many applications, and it is therefore intended not to be limited by the specific embodiment shown and described. Various changes and modifications may be made by one skilled in the art without departing from the true spirit and scope of the invention.

What is claimed is:

1. A ball control assembly comprising:
   a base plate;
   a pair of transverse shafts, each pivotally supported on said base plate for rotation about a longitudinal axis;
   a pair of rollers, each coupled to one of said pair of rotatable shafts for rotation therewith;
   a control ball frictionally coupled to said pair of rollers, the center of said control ball and the axes of rotation of said rollers and shafts lying substantially in one plane, said rollers rotating about their axes of rotation as functions of the components of rotation of said control ball; and
   a ring having a central opening mounted above said base plate, said ball supported on said ring and partially projecting through said central opening and being in contact with said ring along a substantially continuous closed line extending therearound.

2. The assembly defined in claim 1 wherein said ring is made of a fluorocarbon resin compound.

3. A position control ball assembly comprising:
   a base plate;
   at least one housing pivotally mounted on said base plate;
   at least one rotatable shaft mounted in said housing, said rotatable shaft being adapted to rotate about a longitudinal axis thereof;
   a control ball;
   a ring having a central opening in contact with and supporting said control ball for rotation thereon with said ball partially projecting through said central opening;
   means for coupling said rotatable shaft to said control ball so that said rotatable shaft rotates as a function of a component of rotation of said control ball in a direction transverse to said longitudinal axis of said rotatable shaft, said rotatable shaft being adaptable to produce signals related to the rotation thereof; and
   means for biasing said housing toward said control ball so that said means for coupling are continuously coupled to said control ball.

4. The assembly defined by claim 3 wherein said ring is made of a fluorocarbon resin compound.

5. A manually operable control assembly useful for defining a position in a two-dimensional system, said assembly comprising:
   a ring having a central opening;
   a ball in contact with and supported on said ring, and partially projecting through said central opening, for rotational movement only about at least first and second perpendicular axes;
   first and second shafts respectively extending parallel to said first and second axes, each shaft being mounted for rotational movement;
   first means coupling said ball to said first shaft for rotating said first shaft in response to rotation of said ball about said first axis; and
   second means coupling said ball to said second shaft for rotating said second shaft in response to rotation of said ball about said second axis.

6. A manually operable control assembly comprising:
   a ball having a relatively smooth outer surface comprised of a relatively hard material;
   a support plate of relatively soft material exhibiting a relatively low coefficient of friction when in contacting relation to the surface of said ball, said support plate having a circular aperture the diameter of which is less than the diameter of said ball, said ball being supported by said plate through contact with the periphery of said aperture;
   a base member having an upper working surface designated for orientation in a substantially horizontal plane;
   means holding said support plate in displaced relation to said base member working surface with a sufficient clearance therebetween to permit said ball to freely move in non-contacting relation to said base member;
rotatable transducing means supported by said base member in frictional engagement with the surface of said ball to resolve the motion of said ball in effectively two components; and
a cover member fixed relative to said support plate and having a circular aperture therein the diameter of which is less than the diameter of said ball, said cover member being positioned relative to said ball to establish the periphery of the aperture therein immediately adjacent but not in contact with the ball surface.

References Cited by the Examiner

UNITED STATES PATENTS

| | | |
|---|---|---|
| 2,455,963 | 12/1948 | Wheeler. |
| 2,615,069 | 10/1952 | Gallagher. |
| 2,809,130 | 10/1957 | Rappaport. |
| 2,939,332 | 6/1960 | Peterson _____ 74—471 |
| 2,985,025 | 5/1961 | Wilkerson _____ 74—198 |
| 3,013,441 | 12/1961 | Alexander _____ 74—198 X |
| 3,059,318 | 10/1962 | Herbert et al. |
| 3,146,330 | 8/1964 | Miller. |

FOREIGN PATENTS

| | | |
|---|---|---|
| 715,986 | 9/1954 | Great Britain. |
| 821,954 | 10/1959 | Great Britain. |

OTHER REFERENCES

Twiss et al., "Friction of PTFE Dry Bearings," Lubrication Engineering, June 1958, pp. 255–261.

FRED C. MATTERN, JR., *Primary Examiner.*

BROUGHTON G. DURHAM, *Examiner.*

C. F. GREEN, *Assistant Examiner.*